US009148210B2

(12) United States Patent
Seo et al.

(10) Patent No.: US 9,148,210 B2
(45) Date of Patent: Sep. 29, 2015

(54) METHOD FOR TRANSMITTING CHANNEL QUALITY INFORMATION IN A MULTIPLE INPUT MULTIPLE OUTPUT SYSTEM

(71) Applicant: LG ELECTRONICS INC., Seoul (KR)

(72) Inventors: Dong Youn Seo, Anyang-si (KR); Bong Hoe Kim, Anyang-si (KR); Ki Jun Kim, Anyang-si (KR); Hak Seong Kim, Anyang-si (KR); Dong Wook Roh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/589,905

(22) Filed: Jan. 5, 2015

(65) Prior Publication Data

US 2015/0117563 A1 Apr. 30, 2015

Related U.S. Application Data

(63) Continuation of application No. 13/664,336, filed on Oct. 30, 2012, now Pat. No. 8,964,878, which is a continuation of application No. 12/673,745, filed as application No. PCT/KR2008/004743 on Aug. 14, 2008, now Pat. No. 8,761,286.

(60) Provisional application No. 60/956,382, filed on Aug. 16, 2007.

(30) Foreign Application Priority Data

Feb. 1, 2008 (KR) ........................ 10-2008-0010672

(51) Int. Cl.
*H04B 15/00* (2006.01)
*H04B 7/06* (2006.01)
(Continued)

(52) U.S. Cl.
CPC ............ *H04B 7/0632* (2013.01); *H04B 7/0417* (2013.01); *H04W 24/10* (2013.01)

(58) Field of Classification Search
CPC ... H04L 1/0003; H04L 1/0009; H04L 1/0026; H04L 1/0002; H04B 7/0417; H04B 7/0619; H04B 7/0632
USPC ..................... 375/267, 295, 296, 346; 455/69
See application file for complete search history.

(56) References Cited

U.S. PATENT DOCUMENTS

| | | | |
|---|---|---|---|
| 5,175,867 A | 12/1992 | Wejke et al. | |
| 6,031,831 A | 2/2000 | Tan Boon et al. | |

(Continued)

FOREIGN PATENT DOCUMENTS

| | | |
|---|---|---|
| CN | 1797986 | 7/2006 |
| CN | 101013917 | 8/2007 |

(Continued)

OTHER PUBLICATIONS

Ericsson, "Extending Codeword to Layer Mapping for Efficient Support of Retransmisisons," 3GPP TSG-RAN WG1 #50, R1-073735, Aug. 2007, 2 pages.

(Continued)

*Primary Examiner* — Shuwang Liu
*Assistant Examiner* — David S Huang
(74) *Attorney, Agent, or Firm* — Lee, Hong, Degerman, Kang & Waimey

(57) ABSTRACT

A method for transmitting channel quality information (CQI) in a MIMO system is provided that allows a receiver to feed back a CQI value to a transmitter. The method includes receiving a transmission (Tx) pilot signal for each Tx antenna from a base station (BS), measuring a first CQI value of a first codeword and a second CQI value of a second codeword based on the pilot signal, and transmitting the first CQI value of the first codeword and the second CQI value of the second codeword to the BS where at least the first or second CQI value includes specific information capable of indicating a transmission restriction status of a corresponding codeword.

16 Claims, 4 Drawing Sheets

(51) Int. Cl.
  *H04B 7/04* (2006.01)
  *H04W 24/10* (2009.01)

(56) References Cited

U.S. PATENT DOCUMENTS

| | | | |
|---|---|---|---|
| 6,359,923 | B1 | 3/2002 | Agee et al. |
| 6,480,522 | B1 | 11/2002 | Hoole et al. |
| 6,621,851 | B1 | 9/2003 | Agee et al. |
| 6,628,956 | B2 | 9/2003 | Bark et al. |
| 6,804,307 | B1 | 10/2004 | Popovic |
| 6,873,606 | B2 | 3/2005 | Agrawal et al. |
| 7,106,781 | B2 | 9/2006 | Agee et al. |
| 7,149,238 | B2 | 12/2006 | Agee et al. |
| 7,430,244 | B2 | 9/2008 | Chung et al. |
| 7,433,347 | B1 | 10/2008 | Trott et al. |
| 7,469,015 | B2 | 12/2008 | Le Nir et al. |
| 7,577,085 | B1 | 8/2009 | Narasimhan |
| 7,623,441 | B1 | 11/2009 | Sampath et al. |
| 7,675,886 | B2 | 3/2010 | Agrawal et al. |
| 7,720,168 | B2 | 5/2010 | Su et al. |
| 7,724,639 | B1 | 5/2010 | Porat et al. |
| 7,724,838 | B2 | 5/2010 | Mantravadi |
| 7,773,685 | B2 | 8/2010 | Tirkkonen et al. |
| 7,778,151 | B2 | 8/2010 | Bertrand et al. |
| 7,852,806 | B2 | 12/2010 | Ahn et al. |
| 7,869,402 | B2 | 1/2011 | Yoon et al. |
| 7,881,222 | B2 | 2/2011 | Lee et al. |
| 7,889,633 | B2 | 2/2011 | Noh et al. |
| 7,894,330 | B2 | 2/2011 | Lee et al. |
| 7,920,638 | B2 | 4/2011 | Le Nir et al. |
| 7,929,563 | B2 | 4/2011 | Wang et al. |
| 7,961,807 | B2 | 6/2011 | Kotecha et al. |
| 7,991,063 | B2 | 8/2011 | Khan et al. |
| 8,014,769 | B2 | 9/2011 | Lee et al. |
| 8,019,332 | B2 | 9/2011 | Lee et al. |
| 8,027,297 | B2 | 9/2011 | Kim et al. |
| 8,031,583 | B2 | 10/2011 | Classon et al. |
| 8,031,668 | B2 | 10/2011 | Wang et al. |
| 8,036,197 | B2 | 10/2011 | Pajukoski et al. |
| 8,041,362 | B2 | 10/2011 | Li et al. |
| 8,050,227 | B2 | 11/2011 | Lee et al. |
| 8,116,271 | B2 | 2/2012 | Pi |
| 8,155,069 | B2 | 4/2012 | Chun et al. |
| 8,194,579 | B2 | 6/2012 | Lee et al. |
| 8,351,392 | B2 | 1/2013 | Ahn et al. |
| 8,498,254 | B2 | 7/2013 | Dai et al. |
| 8,625,509 | B2 | 1/2014 | Ahn et al. |
| 8,631,298 | B2 | 1/2014 | Lee et al. |
| 8,964,878 | B2 * | 2/2015 | Seo et al. ............... 375/285 |
| 2003/0067907 | A1 | 4/2003 | Rezaiifar et al. |
| 2003/0083069 | A1 | 5/2003 | Vadgama |
| 2003/0185159 | A1 | 10/2003 | Seo et al. |
| 2004/0058687 | A1 | 3/2004 | Kim et al. |
| 2004/0081112 | A1 | 4/2004 | Chen et al. |
| 2004/0133841 | A1 | 7/2004 | Lundby et al. |
| 2004/0257978 | A1 | 12/2004 | Shao et al. |
| 2005/0052991 | A1 | 3/2005 | Kadous |
| 2005/0063378 | A1 | 3/2005 | Kadous |
| 2005/0068918 | A1 | 3/2005 | Mantravadi et al. |
| 2005/0068931 | A1 | 3/2005 | Cho et al. |
| 2005/0157680 | A1 | 7/2005 | Zhang et al. |
| 2005/0180328 | A1 | 8/2005 | Kim et al. |
| 2005/0186981 | A1 | 8/2005 | Nishio |
| 2005/0250540 | A1 | 11/2005 | Ishii et al. |
| 2005/0265250 | A1 | 12/2005 | Gollamudi et al. |
| 2006/0018259 | A1 | 1/2006 | Kadous |
| 2006/0023745 | A1 | 2/2006 | Koo et al. |
| 2006/0034240 | A1 | 2/2006 | Kwak et al. |
| 2006/0034383 | A1 | 2/2006 | Su et al. |
| 2006/0035643 | A1 | 2/2006 | Vook et al. |
| 2006/0045010 | A1 | 3/2006 | Baker et al. |
| 2006/0067413 | A1 | 3/2006 | Tsai |
| 2006/0128410 | A1 | 6/2006 | Derryberry et al. |
| 2006/0146867 | A1 | 7/2006 | Lee et al. |
| 2006/0171342 | A1 | 8/2006 | Dateki |
| 2006/0193373 | A1 | 8/2006 | Agee et al. |
| 2006/0209970 | A1 | 9/2006 | Kanterakis |
| 2006/0285505 | A1 * | 12/2006 | Cho et al. ............... 370/254 |
| 2007/0011550 | A1 | 1/2007 | Agrawal et al. |
| 2007/0040703 | A1 | 2/2007 | Akkarakaran et al. |
| 2007/0070944 | A1 | 3/2007 | Rinne et al. |
| 2007/0140178 | A1 | 6/2007 | Jung et al. |
| 2007/0165739 | A1 | 7/2007 | Hottinen et al. |
| 2007/0171849 | A1 | 7/2007 | Zhang et al. |
| 2007/0183380 | A1 | 8/2007 | Rensburg et al. |
| 2007/0183384 | A1 | 8/2007 | Kwak et al. |
| 2007/0211656 | A1 | 9/2007 | Kwak et al. |
| 2007/0223618 | A1 | 9/2007 | Jeong et al. |
| 2007/0253465 | A1 | 11/2007 | Muharemovic et al. |
| 2007/0254661 | A1 | 11/2007 | Chowdhury et al. |
| 2007/0286261 | A1 | 12/2007 | Molev-Shteiman |
| 2008/0013610 | A1 | 1/2008 | Varadarajan et al. |
| 2008/0019307 | A1 | 1/2008 | Tenny et al. |
| 2008/0032630 | A1 | 2/2008 | Kim et al. |
| 2008/0037464 | A1 | 2/2008 | Lim et al. |
| 2008/0043867 | A1 | 2/2008 | Blanz et al. |
| 2008/0043874 | A1 | 2/2008 | Lee et al. |
| 2008/0080634 | A1 | 4/2008 | Kotecha et al. |
| 2008/0101211 | A1 | 5/2008 | Rao |
| 2008/0151831 | A1 | 6/2008 | Khan et al. |
| 2008/0159323 | A1 | 7/2008 | Rinne et al. |
| 2008/0182582 | A1 | 7/2008 | Bachl et al. |
| 2008/0192674 | A1 | 8/2008 | Wang et al. |
| 2008/0192696 | A1 | 8/2008 | Sachs et al. |
| 2008/0219219 | A1 | 9/2008 | Sartori et al. |
| 2008/0232234 | A1 | 9/2008 | McCoy et al. |
| 2008/0232300 | A1 | 9/2008 | McCoy et al. |
| 2008/0232395 | A1 | 9/2008 | Buckley et al. |
| 2008/0233964 | A1 | 9/2008 | McCoy et al. |
| 2008/0267310 | A1 | 10/2008 | Khan et al. |
| 2008/0287155 | A1 | 11/2008 | Xu et al. |
| 2008/0304467 | A1 | 12/2008 | Papasakellariou et al. |
| 2008/0304593 | A1 | 12/2008 | Khan et al. |
| 2008/0310540 | A1 | 12/2008 | Tiirola et al. |
| 2008/0311911 | A1 | 12/2008 | Koodli et al. |
| 2009/0011700 | A1 | 1/2009 | Nishio et al. |
| 2009/0011767 | A1 | 1/2009 | Malladi et al. |
| 2009/0046672 | A1 | 2/2009 | Malladi et al. |
| 2009/0046774 | A1 | 2/2009 | Abou Rjeily |
| 2009/0046789 | A1 | 2/2009 | Xu et al. |
| 2009/0055703 | A1 | 2/2009 | Kim et al. |
| 2009/0073922 | A1 | 3/2009 | Malladi et al. |
| 2009/0097447 | A1 | 4/2009 | Han et al. |
| 2009/0109906 | A1 | 4/2009 | Love et al. |
| 2009/0168922 | A1 | 7/2009 | Malladi et al. |
| 2009/0175233 | A1 | 7/2009 | Ojala et al. |
| 2009/0196240 | A1 | 8/2009 | Frederiksen et al. |
| 2009/0201863 | A1 | 8/2009 | Pi |
| 2009/0201904 | A1 | 8/2009 | Lee et al. |
| 2009/0238131 | A1 | 9/2009 | Montojo et al. |
| 2009/0245187 | A1 | 10/2009 | Nam et al. |
| 2009/0259909 | A1 | 10/2009 | Luo |
| 2009/0274037 | A1 | 11/2009 | Lee et al. |
| 2009/0290597 | A1 | 11/2009 | Baumgartner et al. |
| 2009/0303866 | A1 | 12/2009 | Li et al. |
| 2009/0316811 | A1 | 12/2009 | Maeda et al. |
| 2010/0067445 | A1 | 3/2010 | Rinne et al. |
| 2010/0103814 | A1 | 4/2010 | Chun et al. |
| 2010/0118796 | A1 | 5/2010 | Yi et al. |
| 2010/0118800 | A1 | 5/2010 | Kim et al. |
| 2010/0220708 | A1 | 9/2010 | Mantravadi et al. |
| 2010/0260115 | A1 | 10/2010 | Frederiksen et al. |
| 2011/0080968 | A1 | 4/2011 | Seo et al. |
| 2011/0142097 | A1 | 6/2011 | Walton et al. |
| 2011/0176502 | A1 | 7/2011 | Chung et al. |
| 2011/0195719 | A1 | 8/2011 | Chmiel et al. |
| 2011/0292900 | A1 | 12/2011 | Ahn et al. |
| 2012/0033650 | A1 | 2/2012 | Ahn et al. |
| 2012/0087363 | A1 | 4/2012 | Jongren et al. |
| 2012/0287901 | A1 | 11/2012 | Ahn et al. |
| 2013/0039292 | A1 | 2/2013 | Liu et al. |
| 2013/0070702 | A1 | 3/2013 | Ko et al. |

(56) References Cited

U.S. PATENT DOCUMENTS

| | | | |
|---|---|---|---|
| 2013/0083750 | A1 | 4/2013 | Nazar et al. |
| 2013/0121247 | A1 | 5/2013 | Seo et al. |
| 2013/0235812 | A1 | 9/2013 | Heo et al. |

FOREIGN PATENT DOCUMENTS

| | | |
|---|---|---|
| EP | 1175022 | 1/2002 |
| EP | 1349292 | 10/2003 |
| EP | 1389848 | 2/2004 |
| EP | 1720310 | 11/2006 |
| EP | 1746855 | 1/2007 |
| EP | 1784036 | 5/2007 |
| EP | 1819088 | 8/2007 |
| JP | 2001-238269 | 8/2001 |
| JP | 2005-522911 | 7/2005 |
| JP | 2007028569 | 2/2007 |
| JP | 2008-054313 | 3/2008 |
| KR | 10-2002-0009079 | 2/2002 |
| KR | 10-2005-0014695 | 2/2005 |
| KR | 10-2005-0057926 | 6/2005 |
| KR | 10-2006-0092055 | 8/2006 |
| KR | 10-0729861 | 6/2007 |
| KR | 10-2007-0073608 | 7/2007 |
| WO | 01-76110 | 10/2001 |
| WO | 2004-049613 | 6/2004 |
| WO | 2004-051872 | 6/2004 |
| WO | 2005/015801 | 2/2005 |
| WO | 2005-074312 | 8/2005 |
| WO | 2005099103 | 10/2005 |
| WO | 2005-114888 | 12/2005 |
| WO | 2005-117319 | 12/2005 |
| WO | 2006/020339 | 2/2006 |
| WO | 2006/028204 | 3/2006 |
| WO | 2006/107835 | 10/2006 |
| WO | 2006/129749 | 12/2006 |
| WO | 2006/130742 | 12/2006 |
| WO | 2006-138337 | 12/2006 |
| WO | 2006129749 | 12/2006 |
| WO | 2007015305 | 2/2007 |
| WO | 2007/066936 | 6/2007 |
| WO | 2007/092258 | 8/2007 |

OTHER PUBLICATIONS

Texas Instruments, "Aspects of Codebook-based Pre-coding for E-UTRA MIMO," 3GPP TSG RAN WG1 47, R1-063238, Nov. 2006, 3 pages.
Samsung, "Data and Control Channel Multiplexing in SC-FDMA for EUTRA Uplink," 3GPP TSG RAN WG1 Meeting #43, R1-051343, Nov. 2005, 2 pages.
NTT DoCoMo, et al., "Multiplexing Method of Shared Control Channel in Uplink Single-Carrier FDMA Radio Access," TSG-RAN WG1 #42bis, R1-051143, Oct. 2005, 9 pages.
InterDigital Communications Corporation, "Uplink MIMO SC-FDMA Scheme for EUTRA," 3GPP TSG RAN WG1 #43, R1-051368, Nov. 2005, 6 pages.
3rd Generation Partnership Project (3GPP), "Technical Specification Group Radio Access Network; Physical Layer Aspects for Evolved UTRA (Release 7)," 3GPP TR 25.814 V1.0.1, Nov. 2005, 72 pages.
European Patent Office Application Serial No. 08723799.6, Decision to Grant dated Jan. 8, 2014, 32 pages.
U.S. Appl. No. 12/526,499, Notice of Allowance dated Feb. 19, 2014, 9 pages.
U.S. Appl. No. 12/673,745, Office Action dated Mar. 1, 2013, 11 pages.
U.S. Appl. No. 12/532,733 Final Office Action dated Mar. 13, 2013, 8 pages.
U.S. Appl. No. 12/532,944, Notice of Allowance dated May 5, 2014, 16 pages.
U.S. Appl. No. 12/526,499, Office Action dated Jul. 15, 2013, 11 pages.
U.S. Appl. No. 14/280,338, Office Action dated Aug. 27, 2014, 11 pages.
U.S. Appl. No. 12/532,944, Office Action dated Sep. 3, 2013, 17 pages.
U.S. Appl. No. 13/553,493, Office Action dated Sep. 5, 2013, 9 pages.
U.S. Appl. No. 12/669,759, Final Office Action dated Oct. 16, 2013, 15 pages.
In the U.S. Appl. No. 12/669,441, Final Office Action, dated Nov. 21, 2012, 30 pages.
Texas Instruments, "Views on MIMO-Related UE Feedback," 3GPP TSG RAN WG1 47bis, R1-070273, Jan. 2007, 3 pages.
LG Electronics, "CQI overhead reduction for MIMO in frequency domain," 3GPP TSG RAN WG1 #48bis, R1-071545, Mar. 2007, 5 pages.
Korean Intellectual Property Office Application Serial No. 10-2008-0055497, Notice of Allowance dated Jun. 5, 2014, 2 pages.
Samsung, "UL reference signal multiplexing", R1-063257, 3GPP TSG RAN WG1 Meeting #47, Nov. 2006.
3rd Generation Partnership Project, "Technical Specification Group Radio Access Network; Evolved Universal Terrestrial Radio Access (E-UTRA) Radio Resource Control (RRC); Protocol specification (Release 8)", 3GPP TS 36.331, V8.0.0, Dec. 2007.
3rd Generation Partnership Project, "Technical Specification Group Radio Access Network; Evolved Universal Terrestrial Radio Access (E-UTRA); Radio Resource Control (RRC); Protocol specification (Release 8)", 3GPP TS 36.331, V8.14.0, Jun. 2011.
Nokia, "Data-non-associated Control Signal Transmission with UL Data," 3GPP TSG RAN WG1 Meeting #48, R1-071000, Feb. 2007, XP-002573203.
3rd Generation Partnership Project (3GPP), "Technical Specification Group Radio Access Network; LTE Physical Layer—General Description (Release 8)," 3GPP TS 36.201 v0.3.1, R1-071252, Mar. 2007, XP-050105207.
LTE Rapporteur (NTT DoCoMo), "Text Proposal for TS 36.300 (Stage 2 TS)," 3GPP TSG RAN WG1 Meeting #48, R1-071251, Feb. 2007, XP-050105206.
Bo Goransson et al., "Evolution of WCDMA high speed packet access and broadcast services", IEEE 8th Workshop on Signal Processing Advances in Wireless Communications (SPAWC), Jun. 2007, XP-031189506.
"Part 16: Air Interface for Broadband Wireless Access Systems", P802.16Rev2/D0b, pp. 1-1754, Jun. 2007, XP-017631176.
Lee, H., et al., "Novel Multi-User MIMO Scheme Based on Successive Interference Cancellation," IEEE International Symposium on Consumer Electronics, Jun. 20, 2007, XP031160370.
LG Electronics, "Allocation of UL ACK/NACK Index," 3GPP TSG RAN WG1#49, R1-072348, May 7, 2007, XP050106077.
LG Electronics, "PHICH Duration and Signaling," 3GPP TSG RAN WG1#50, R1-073476, Aug. 20, 2007, XP050107084.
Ericsson, "E-mail Summary Taking you Forward on Downlink Control Signaling," 3GPP TSG RAN WG1#50bis, R1-074369, Oct. 8, 2007, XP050107884.
Motorola, "PHICH Resource Signaling for TDD & FDD," 3GPP TSG RAN #51bis, R1-080433, Jan. 14, 2007, XP050108952.
Motorola, "PHICH Resource Signaling for TDD & FDD," 3GPP TSG RAN #52bis, R1-081286, Apr. 1, 2008, XP050109724.
Catt, et al., "Indication of PHICH Resource for TDD," 3GPP TSG RAN #52bis, R1-081326, Mar. 31, 2008, XP050109752.
Panasonic, "CQI Feedback Control and Content in E-UTRA", 3GPP TSG-RAN WG1 Meeting #49, R1-072077, May 7, 2007, XP050105831.
"LS on physical channel definition," R1-073231, 3GPP TSG RAN WG1 Meeting #49bis, Jun. 2007.
Motorola, "Search Space Definition for L1/L2 Control Channels," R1-072691, 3GPP TSG RAN1 #49bis, Jun. 2007.
Mitsubishi Electric, "UE and CCE specific scrambling codes for low complexity blind detection of downlink control signaling," R1-072063, 3GPP TSG RAN WG1 #49 meeting, May 2007.
Korean Intellectual Property Office Application Serial No. 10-2008-009164, Notice of Allowance dated Sep. 5, 2014, 2 pages.
U.S. Appl. No. 12/532,944, Final Office Action dated Feb. 5, 2013, 16 pages.

(56) References Cited

OTHER PUBLICATIONS

State Intellectual Property Office of the People's Republic of China Application Serial No. 200880112054.X, Office Action dated Feb. 1, 2013, 6 pages.

Kim, et al., "On Capacity of Quality-Based Channel-State Reporting in Mobile Systems With Greedy Transmission Scheduling," IEEE Transactions on Communications, vol. 54, No. 6, Jun. 2006, pp. 975-979.

U.S. Appl. No. 13/553,493, Notice of Allowance dated Jan. 17, 2014, 12 pages.

U.S. Appl. No. 14/280,338, Office Action dated Mar. 23, 2015, 10 pages.

U.S. Appl. No. 12/669,759, Office Action dated Apr. 23, 2015, 17 pages.

United States Patent and Trademark Office U.S. Appl. No. 14/449,931, Office Action dated Jul. 8, 2015, 28 pages.

* cited by examiner

METHOD FOR TRANSMITTING CHANNEL QUALITY INFORMATION IN A MULTIPLE INPUT MULTIPLE OUTPUT SYSTEM

CROSS-REFERENCE TO RELATED APPLICATIONS

This application is a continuation of U.S. application Ser. No. 13/664,336, filed on Oct. 30, 2012, now U.S. Pat. No. 8,964,878, which is a continuation of U.S. application Ser. No. 12/673,745, filed Feb. 16, 2010, now U.S. Pat. No. 8,761,286, which is the National Stage filing under 35 U.S.C. 371 of International Application No. PCT/KR2008/004743, filed on Aug. 14, 2008, which claims the benefit of earlier filing date and right of priority to Korean Application No. 10-2008-0010672, filed on Feb. 1, 2008, and also claims the benefit of U.S. Provisional Application No. 60/956,382, filed on Aug. 16, 2007, the contents of which are all hereby incorporated by reference herein in their entireties.

TECHNICAL FIELD

The present invention relates to a Multiple Input Multiple Output (MIMO) system, and more particularly to a method for transmitting a channel quality information (CQI) in a Multiple Input Multiple Output (MIMO) system.

BACKGROUND ART

A Multiple Input Multiple Output (MIMO) technology will hereinafter be described in detail. In brief, the MIMO technology is an abbreviation of the Multi-Input Multi-Output technology. The MIMO technology uses multiple transmission (Tx) antennas and multiple reception (Rx) antennas to improve the efficiency of Tx/Rx data, whereas a conventional art has generally used a single transmission (Tx) antenna and a single reception (Rx) antenna. In other words, the MIMO technology allows a transmitting end or receiving end of a wireless communication system to use multiple antennas (hereinafter referred to as a multi-antenna), so that the capacity or performance can be improved. For the convenience of description, the term "MIMO" can also be considered to be a multi-antenna technology.

In more detail, the MIMO technology is not dependent on a single antenna path to receive a single total message, collects a plurality of data pieces received via several antennas, and completes total data. As a result, the MIMO technology can increase a data transfer rate within a specific coverage, or can increase system coverage at a specific transfer rate. In other words, the MIMO technology is the next-generation mobile communication technology capable of being applied to mobile communication terminals or relays.

The MIMO technology from among a variety of technologies can greatly increase an amount of communication capacity and Tx/Rx performances without allocating additional frequencies or increasing an additional power. Due to these technical advantages, most companies or developers are intensively paying attention to this MIMO technology. The next-generation mobile communication technology requires a data transfer rate higher than that of a conventional mobile communication technology, so that it is expected that the effective MIMO technology is requisite for the next-generation mobile communication technology. Under this situation, the MIMO communication technology is the next-generation mobile communication technology capable of being applied to mobile communication terminals or relays, and can extend the range of a data communication range, so that it can overcome the limited amount of transfer data of other mobile communication systems due to a variety of limited situations.

The above-mentioned MIMO technology can be classified into a spatial diversity scheme and a spatial multiplexing scheme. The spatial diversity scheme increases transmission reliability using symbols passing various channel paths. The spatial multiplexing scheme simultaneously transmits a plurality of data symbols via a plurality of Tx antennas, so that it increases a transfer rate of data. Detailed descriptions of the spatial diversity scheme, the spatial multiplexing scheme, and the combination thereof will hereinafter be described in detail.

Firstly, the spatial diversity scheme will hereinafter be described. The spatial diversity scheme is classified into a space-time block code scheme and a space-time Trellis code scheme which simultaneously uses a diversity gain and a coding gain. Generally, a bit error ratio (BER) improvement performance and a code-generation degree of freedom of the space-time Trellis code scheme are superior to those of the space-time block code scheme, whereas the calculation complexity of the space-time block code scheme is superior to that of the space-time Trellis code scheme. The above-mentioned spatial diversity gain corresponds to the product or multiplication of the number ($N_T$) of Tx antennas and the number ($N_R$) of Rx antennas, as denoted by $N_T \times N_R$.

Secondly, the spatial multiplexing scheme will hereinafter be described. The spatial multiplexing scheme is adapted to transmit different data streams via individual Tx antennas. In this case, a receiver may unavoidably generate mutual interference between data pieces simultaneously transmitted from a transmitter. The receiver removes this mutual interference from the received data using a proper signal processing technique, so that it can receive the resultant data having no interference. In order to remove noise or interference from the received data, a maximum likelihood receiver, a ZF receiver, a MMSE receiver, a D-BLAST, or a V-BLAST may be used. Specifically, if a transmitting end can recognize channel information, a Singular Value Decomposition (SVD) scheme may be used to remove the noise or interference.

Thirdly, the combination of the spatial diversity scheme and the spatial multiplexing scheme will hereinafter be described. Provided that only a spatial diversity gain is acquired, the performance-improvement gain is gradually saturated in proportion to an increasing diversity order. Otherwise, provided that only the spatial multiplexing gain is acquired, a transmission reliability of a RF channel is gradually deteriorated. As a result, a variety of schemes capable of acquiring all the above-mentioned two gains simultaneously while solving the above-mentioned problems have been intensively researched by many companies or developers, for example, a double-STTD scheme and a space-time BICM (STBICM) scheme.

DISCLOSURE

Technical Problem

Accordingly, the present invention is directed to a method for transmitting a channel quality information (CQI) in a Multiple Input Multiple Output (MIMO) system that substantially obviates one or more problems due to limitations and disadvantages of the related art.

An object of the present invention is to provide a method for transmitting CQI in a Multiple Input Multiple Output (MIMO) system.

Another object of the present invention is to provide a method for indicating some codewords in transmission restriction status using CQI, on the condition that several codewords of a MIMO system have been transmitted from a transmitter to a receiver and the CQI measured by the receiver in association with each codeword has been transmitted from the receiver to the transmitter in response to the transmitted several codewords. In other words, the receiver informs that CQI of some codewords cannot be measured.

In brief, the present invention aims to allow the receiver to indicate that a channel quality of a corresponding codeword has an unavailable reception status.

Technical Solution

To achieve these objects and other advantages and in accordance with the purpose of the invention, as embodied and broadly described herein, a method for allowing a receiver to feed back a CQI value to a transmitter in a Multiple Input Multiple Output (MIMO) system comprising: receiving a transmission (Tx) pilot signal for each Tx antenna from a base station (BS); measuring a first CQI value of a first codeword and a second CQI value of a second codeword on the basis of the pilot signal; and transmitting the first CQI value of the first codeword and the second CQI value of the second codeword to the base station (BS), wherein at least one of the first and second CQI values includes specific information capable of indicating a transmission restriction status of a corresponding codeword.

Preferably, the first and second CQI values are indicative of CQI of some parts of a total band.

Preferably, the first and second CQI values are transmitted via at least one of quantized channel status information, a SINR (Signal to Interference plus Noise Ratio), and a MCS (Modulation and Coding Selection) level index.

Preferably, the specific information indicating the transmission disallowance information is any one of a SINR (Signal to Interference plus Noise Ratio) of '$-\infty$dB', a coding rate of '0', a modulation order of '0', and a predetermined MCS level index.

Preferably, the predetermined MCS level index is predetermined to indicate either of the coding rate of '0' or the modulation order of '0'.

Preferably, the second CQI value includes a relative channel information value associated with the first CQI value.

Preferably, provided that the second CQI value is reconstructed by the first CQI value and its associated relative value, if the reconstructed value is a non-existing value or is in a transmission restriction status based on the first CQI value, the second CQI value indicates the transmission restriction status.

It is to be understood that both the foregoing general description and the following detailed description of the present invention are exemplary and explanatory and are intended to provide further explanation of the invention as claimed.

Advantageous Effects

The MIMO system according to the present invention can transmit a CQI.

According to the following embodiments of the present invention, if the MIMO system transmits several codewords and the CQI of each codeword, it can indicate that some codewords is in transmission restriction status using the CQI.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Figure 1:
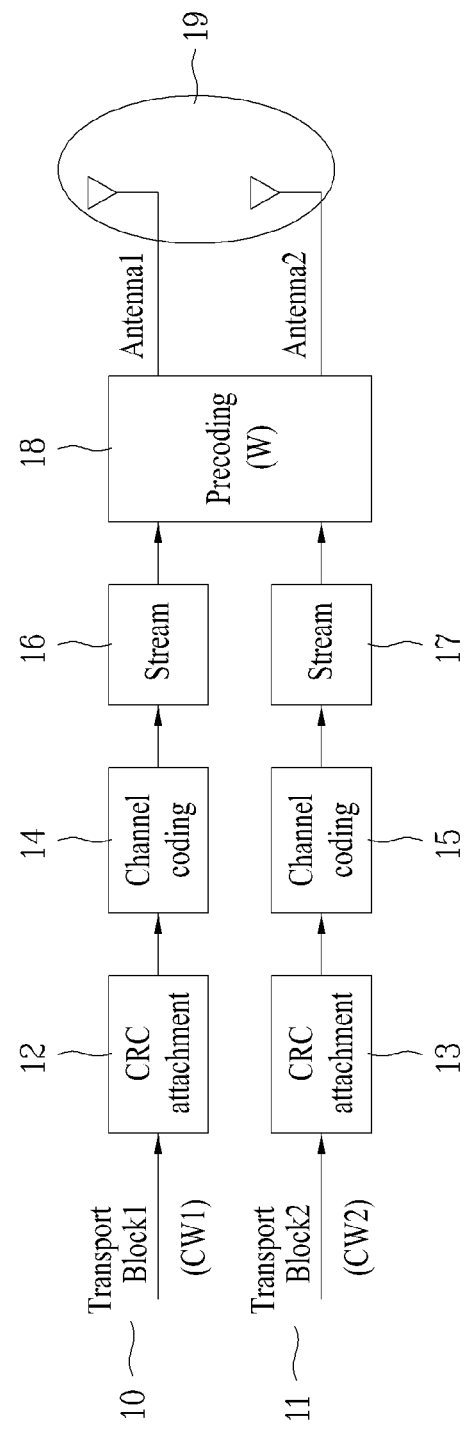
FIG. 1 is a block diagram illustrating a transmission structure of a MIMO system including the (2×2)-antenna structure.

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

In the meantime, if several transmission information units are overlapped and then received, the present invention can expect performance improvement using an interference-cancellation receiver. A brief description of the interference-cancellation structure will be as follows.

According to the interference-cancellation structure, after the first information is demodulated/decoded from a total reception signal in which some information is overlapped, information associated with the first information is removed from the total reception signal. A second signal is demodulated/decoded by the resultant signal having no first information removed from the reception signal. A third signal is demodulated/decoded by the resultant signal having no first- and second-information removed from the first reception signal. A fourth signal or other signal after the fourth signal repeats the above-mentioned processes, so that the fourth or other signal is demodulated/decoded. In order to use the above-mentioned interference cancellation method, the demodulated/decoded signal removed from the reception signal must have no error. If any error occurs in the demodulated/decoded signal, error propagation occurs so that a negative influence continuously affects all the demodulated/decoded signals.

As described above, in order to minimize the error propagation caused by the interference cancellation, it is preferable that the interference is selectively removed after determining the presence or absence of an error in the demodulated/decoded signal. One of methods for determining the presence or absence of the error in each transmission information is cyclic redundancy check (CRC) method.

A general communication system performs encoding of transmission information of a transmitting end using a forward error correction code, and transmits the coded information, so that an error experienced at a channel can be corrected by a receiving end. The receiving end demodulates a received (Rx) signal, and performs decoding of forward error correction code on the demodulated signal, so that it recovers the transmission information. By the decoding process, the Rx-signal error caused by the channel is corrected.

Each of all forward error correction codes has a maximum-correctable limitation in a channel error correction. In other words, if a reception (Rx) signal has an error exceeding the limitation of a corresponding forward error correction code, a receiving end is unable to decode the Rx signal into information having no error. Therefore, the receiving end must be able to check the presence or absence of an error in the decoded information. In this way, a specialized coding process for performing error detection is required, separately from the forward error correction coding process. Generally, a Cyclic Redundancy Check (CRC) code is used as an error detection code.

The CRC method is an exemplary coding method for performing the error detection. Generally, the transmission information is coded by the CRC method, and then the forward error correction code is applied to the CRC-coded information. A single unit coded by the CRC and the forward error correction code is generally called a codeword. In other words, a unit of distinctive information processed by the CRC coding is called a codeword.

Therefore, in order to minimize the error propagation caused by the interference cancellation, it is preferable that the interference is selectively removed after determining the presence or absence of an error in the demodulated/decoded signal. Therefore, a representative method for using the interference cancellation technology is a specific case in which several transmission information segments and several codewords are used.

If several transmission information units are overlapped and then received, the present invention can expect performance improvement using an interference-cancellation receiver. There are many cases in the above-mentioned case in which several transmission information segments are overlapped and then received, for example, a case in which the MIMO technology is used, a case in which a multi-user detection technology is used, and a case in which a multi-code technology is used. In order to use the above-mentioned interference cancellation technology, several transmission information segments must be overlapped/transmitted via multiple antennas. In other words, if the spatial multiplexing technology is used, each of transmission information is detected, and at the same time the interference cancellation technology can be used.

In this case, several transmission information segments may be defined as several codewords as described above, and be then transmitted. The following embodiment assumes that the MIMO system transmits a plurality of codes and transmits control information per each codeword. However, the following embodiment has been disclosed for only illustrative purposes, and it should be noted that the scope and spirit of this embodiment will be equally applied to various transmission information constituent units of various systems capable of transmitting several transmission information segments.

FIG. 1 is a block diagram illustrating a transmission structure of a MIMO system including the (2×2)-antenna structure.

Referring to FIG. 1, the system capable of transmitting a plurality of codewords, each of which is used as the aforementioned CRC attachment unit, is able to construct several transmission chains as many as the number of codewords capable of being simultaneously transmitted. FIG. 1 shows an example of the transmission structure equipped with the (2×2)-antenna structure. In the case of min(M,N)=2, the maximum number of transmittable streams (i.e., a maximum rank) may be set to "2". Referring to FIG. 1, the current rank is 2. If a CW1 (10) and a CW2 (12) are transmitted, the MIMO system according to the present invention can recognize that a transmission chain is constructed. CRCs are attached to CW1 (10) and CW2 (12) as denoted by '12' and '13'. The channel coding is carried out on each of the CRC attachment results 12 and 13. The modulated streams 15 and 17 are precoded by the precoding unit 18, such that the precoded result can be transmitted via each Tx antenna 19.

Next, control information transmitted from the above-mentioned MIMO system will hereinafter be described in detail. For example, CQI may be used as the above-mentioned control information transmitted from the MIMO system. Namely, a receiving end of the MIMO system measures the status of a channel through which a signal is transmitted from a transmitting end, and then deliver information about the status to the transmitting end.

Figure 2:
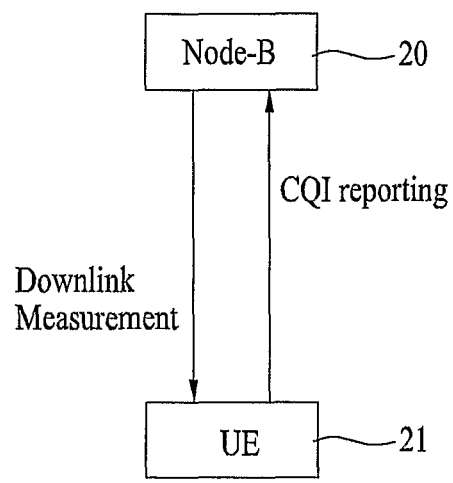
FIG. 2 is a conceptual diagram illustrating a method for transmitting CQI from a UE to a Node-B.

FIG. 2 is a conceptual diagram illustrating a method for transmitting CQI from a user equipment (UE) to a Node-B.

Referring to FIG. 2, the UE 21 receives a downlink signal from the Node-B 20, and measures a downlink channel status. The UE 21 transmits a channel status measurement result as the CQI back to the Node-B 20. Specifically, the Node-B may be able to perform a link adaptation process, such that it can use a maximum amount of channel capacity of the mobile communication system and can effectively transmit data to users. It is preferable that the UE feeds back CQI to the Node-B to perform the link adaptation process.

In the meantime, in multi-carrier system, channel qualities are different per each of frequency bands for data transmission. In order to effectively allocate resources, the user (i.e., the UE) transmits CQI of a total frequency band. Therefore, the total frequency band is divided into several units of frequency bands, and the CQI can be transmitted via each unit of frequency bands.

This CQI may be generated in various ways, for example, a method of simply quantizing a channel status without any change, a method of calculating a SINR (Signal to Interference+Noise Ratio), and a method of using MCS (Modulation and Coding Selection) level information to indicate the status of a channel in real condition.

A method of generating CQI based on MCS among various CQI generation methods will be explained hereinafter. An example for this method is a CQI generation method for a High Speed Downlink Packet Access (HSDPA) transmission scheme under the 3GPP. In case that the CQI is generated on the basis of MCS, MCS consists of a modulation scheme, a coding scheme, and the resultant coding rate. Hence, it is preferable that at least one CQI be transmitted per each codeword which is considered as a modulation/coding unit, because the CQI is to be changed according to the change of the modulation scheme and the coding scheme.

In addition, different channel measurement scheme and/or different reporting scheme may be applied to CQI according to the type of a signal or a channel. For example, a communication channel between the Node-B and the UE can be generally classified into a data traffic channel and a control channel for controlling the data traffic channel. If the data traffic channel and the control channel have different frequency/spatial bands, the data traffic channel and the control channel may also have different CQI values.

Generally, for a control channel in the multiple-carrier system, frequency diversity and spatial diversity are used throughout the whole band. Therefore, the CQI for a control channel is measured and fed back for the whole band.

To the contrary, in case of the data traffic channel, scheduling and spatial multiplexing is performed for each frequency band. Therefore, it is preferable to divide the frequency band into sub-frequency bands and measure CQI value for each sub-frequency band, and then feed back the measured CQI.

Control information transmitted from the MIMO system may be exemplified by rank information. The rank information is a control information that indicates how many independent data streams can be transmitted at a current transmission time, when the MIMO system transmits several independent data streams. That is, rank is defined as the number of maximum data streams that can be transmitted at a certain transmission time. Rank may also be called as a spatial multiplexing rate. Rank might be decided in consideration of the combination of antennas of a transceiver. For example, the system including M number of Tx antennas and N number of Rx antennas has a maximum rank of min(M,N).

For another example, Tx control information of the MIMO system may be precoding matrix index information. A MIMO system using a precoding scheme can transmit control information associated with either a precoding vector or a precoding matrix which is the most appropriate for a current channel status.

The precoding vector or the precoding matrix can be directly delivered by transmitting control information including configuration information of a vector or a matrix. Otherwise, on the condition that a plurality of precoding matrix are predefined beforehand with a form of codebook. The precoding vector or the precoding matrix can be directly delivered by transmitting index information in corresponding codebook. In this case, the codebook may be predetermined and stored in the transmission/receiving ends for each rank, or may also be configured in the form capable of being applied to several ranks and be then stored in the transmission/receiving ends for each rank. In this way, in the case of using the above-mentioned codebook, only index information of the predetermined precoding vector or precoding matrix may be transmitted to the transmission/receiving ends, such that the transmission load of the control information can be reduced.

The control information including the CQI can be transmitted to an upper layer signal or a physical layer control signal. In the case of transmitting the control signal to the physical layer control signal, if a downlink shared channel (DL-SCH) exists for a UE, then the control signal can puncture data symbols or bits of the DL-SCH to be transmitted. Otherwise, the control signal can be transmitted via a dedicated control channel such as Physical Uplink Control Channel (PUCCH).

In order to reduce an uplink feedback load, time period and measurement frequency band may be differently configured for control information such as rank information and precoding information. For example, considering a feedback period from the receiver to the transmitter, rank is insensitive to a time variation whereas CQI is sensitive to a time variation, such that a transmission period of rank information may be set relatively longer than that of CQI.

Figure 3:
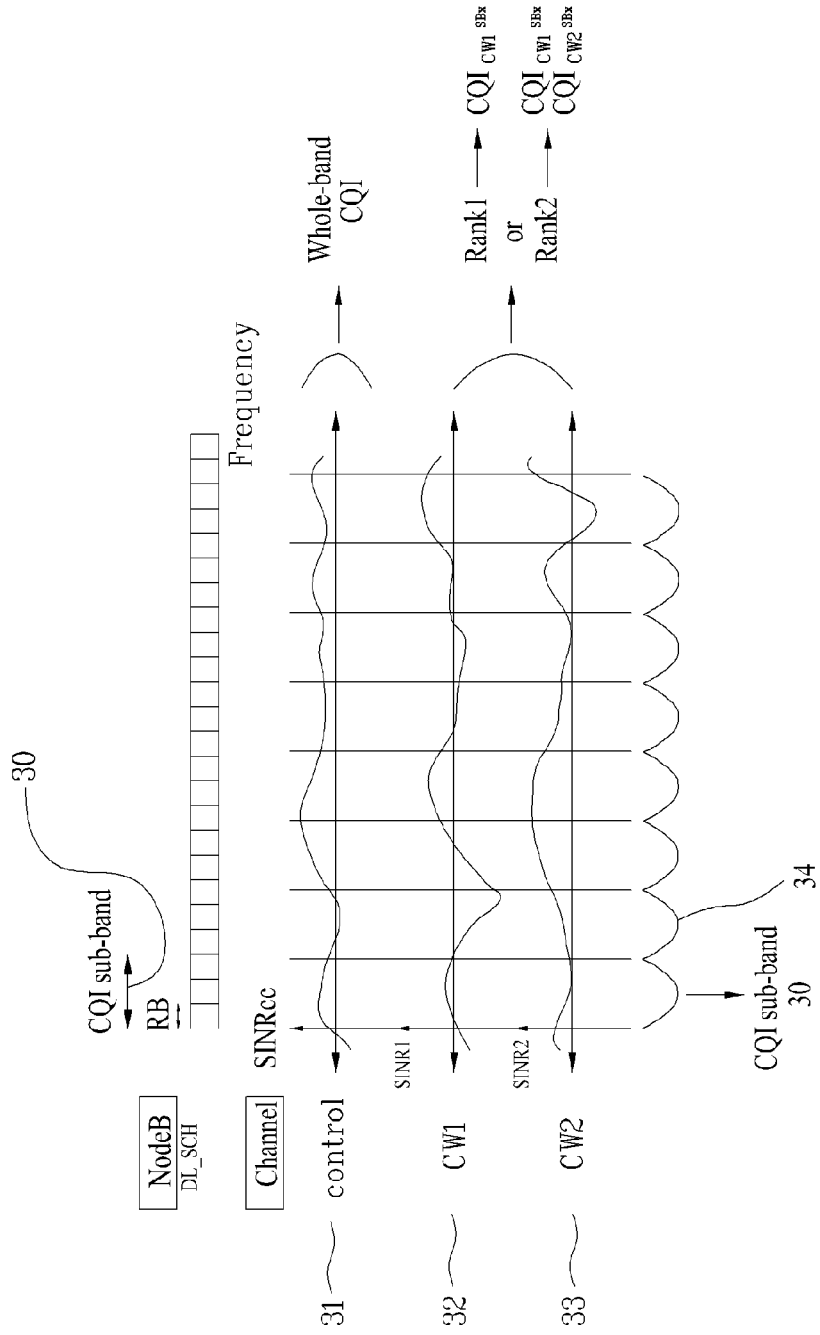
FIG. 3 shows the CQI result measured by a receiving end according.

FIG. 3 shows a result of generating CQI by measuring channel information at a receiving end.

FIG. 3 shows the CQI of the control channel 31, the CW1 32 of the data traffic channel and the CQI of the CW2 33. As described above, when the CQI of the control channel and the data traffic channel is transmitted, the CQI may be configured in different ways for each of the control channel and the data traffic channel.

In other words, for the frequency band for measurement, generally, because a control channel is evenly distributed to whole bands, the CQI can be configured for the whole bands. In case of data traffic channel, frequency bands may be divided into a plurality of CQI sub-bands for scheduling of frequency bands, and then CQI for each of CQI sub-bands 30 or a group of CQI sub-bands can be configured.

Because the control channel is transmitted using a spatial diversity scheme and the data traffic channel is transmitted using a spatial multiplexing scheme, each of data and control information is transmitted through different physical channels. As a result, the SINR received at a receiving end may be different to each other as shown in FIG. 3. In addition, the SINR for the data traffic channel received at a receiving end may be different according to rank. For example, for rank 2, two codewords (i.e., a CW1 32 and CW2 33) is transmitted, such that SINR1 and SINR2 might decrease due to unexpected interference between CW1 32 and CW2 33. Furthermore, provided that at least one CQI is transmitted for each codeword, the CQI amount fed back may be changed according to whether the rank is 1 or 2, and signaling structure may have different format according to the rank.

In the meantime, rank information is generally measured with a unit of bandwidth greater than the total band or CQI sub-band. However, if channel status fluctuates drastically with frequency bands, the rank information measured as above may not be fit for some sub-bands. That is, provided that a rank value is set to 2 for a whole bandwidth, the channel status of CW1 32 or CW2 33 in a certain band 34 may be poor as shown in FIG. 3, and thus transmitting only one stream may be more effective than transmitting both of two streams.

In the meantime, when feeding back from a receiver to a transmitter, it is effective to transmit rank information with relatively longer period compared to the transmitting period for CQI, in consideration of a sensitivity to time variation. If the transmission period of the rank information is longer than that of the CQI, a pre-reported rank information may not match to the rank status at a CQI report time due to time variation. That is, even though it was reported that a rank was 2, a channel status may be changed to a poor channel status, such that it is more preferable that single-codeword transmission be better than two-codeword transmission.

Under the above-mentioned two situations, the Node-B may expect receiving a report on CQI with rank 2 from UE. In other words, the Node-B may expect that two CQI values (CW1 32 and CW2 33) will be reported, and then the Node-B may recognize control information according to the signaling format associated with the expectation. However, if there is a CQI sub-band 34 in which only one stream is to be transmitted, a method for indicating this situation is required.

In the present embodiment according to the present invention, CQI includes transmission restriction status information which is capable of indicating not to use a specified codeword for transmitting data. In addition, a request to adaptively change the number of transmission codewords for some sub-bands may be delivered with the same format.

Based on the control information according to the present embodiment, the transmitting end may select one of following schemes. First, only one codeword may be transmitted. Second, for a codeword requested to restrict for transmission with the transmission restrictions status information, the codeword may still be transmitted enduring a higher error rate than a target error rate. Third, for a codeword requested to restrict for transmission with the transmission restrictions status information, the codeword may be transmitted with increased transmission power.

Figure 4:
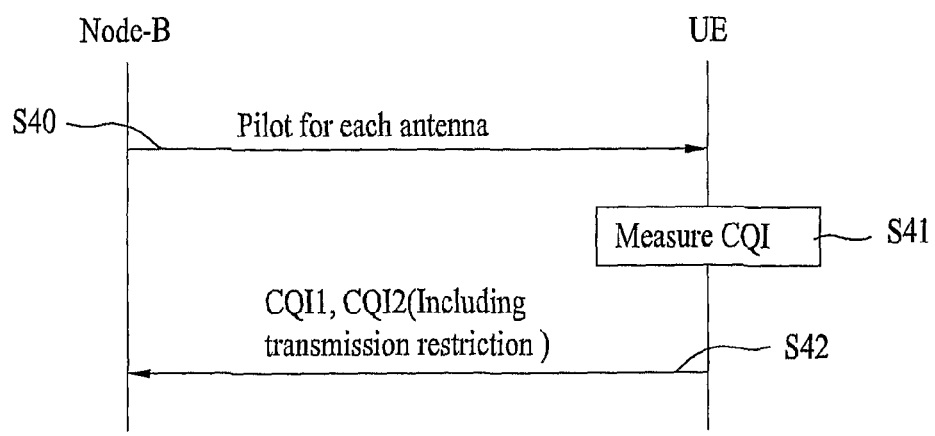
FIG. 4 is a flow chart illustrating a method for transmitting the CQI according to the present invention.

FIG. 4 is a flow chart illustrating a method for transmitting the CQI according to the present invention.

Referring to FIG. 4, it is provided that rank is set to 2, the whole of a data traffic channel is divided to a plurality of CQI sub-bands, and CQI reports are performed for each of the CQI sub-bands.

Referring to FIG. 4, the Node-B transmits a pilot signal to each Tx antenna at step S40. The UE receives the pilot signal channel transmitted through according to link adaptation scheme etc., and measures Tx channel qualities of two codewords (i.e. CW1 and CW2) on the basis of the received pilot signal according to a channel estimation scheme. In this case, if channel quality of a specific CQI sub-band is equal to or less than a reference value, CQI including information that is capable of reporting transmission restriction status is transmitted at S42 sot as to report the above situation to the base station.

In the case of transmitting the CQI, the UE is able to transmit CQI values of two codewords as described above. In this case, information indicating transmission restriction status might be included in the CQI for the total band or in the CQI for some sub-bands, and then the CQI for the total band or in the CQI for some sub-bands might be transmitted. For example, provided that a current rank is set to 2 to transmit two codewords (i.e. CW1 and CW2), transmit status information indicating that only one of the two codewords (CW1 and CW2) can be transmitted may be transmitted as CQI.

So as to selectively limit transmission of codewords capable of being transmitted at a current rank, transmission restriction status might be included in the CQI for all codewords, otherwise, the transmission restriction status might be included in the CQI for specific codewords in order to restrict a transmission for part of codewords.

In the case of including the transmission restriction status into the CQI for specific codewords, a low-performance codeword might be determined as a codeword capable of transmitting the above transmission restriction status information in consideration of a statistical channel status. In this case, if the low-performance codeword is changed to another codeword according to a channel-status variation, the codeword capable of transmitting the transmission restriction status information can also be adaptively changed.

Some codewords may also be determined as a dedicated codeword for use of transmitting transmission restriction status information. Although some codewords are dedicated in this way, interference that may be caused between above codewords can be prevented, therefore, the effects anticipated by the present invention can be obtained.

Transmission restriction status may be represented in various ways according to transmitted CQI value. For example, if a SINR value is transmitted as the CQI, the value of "SINR=−∞dB" may represent the transmission restriction status. If a code rate or a modulation scheme is transmitted as the CQI value, "code rate=0" or "modulation order=0" may represent the transmission restriction status. Specifically, if a MCS index is transmitted as the CQI, a specific index may be transmitted to represent the transmission restriction status. According to the above-mentioned methods, the MIMO system matches the combination of bits transmitted as the CQI with a single logical status, and transmits the matched result.

The table 1 shows a MCS table including transmission restriction status in a case that MCS index is transmitted as CQI.

TABLE 1

| CQI value (state) for CW | Function |
| --- | --- |
| 0 | Transmission restriction status(Tx off) |
| 1 | Modulation: QPSK, code rate: 1/3 |
| 2 | Modulation: QPSK, code rate: 1/2 |
| 3 | Modulation: QPSK, code rate: 2/3 |
| 4 | Modulation: 16QAM, code rate: 1/3 |
| 5 | Modulation: 16QAM, code rate: 2/3 |
| 6 | Modulation: 64QPSK, code rate: 1/3 |
| 7 | Modulation: 64QPSK, code rate: 2/3 |

As can be seen from Table 1, when the MCS index is transmitted as CQI, index information of the MCS table may be transmitted as a CQI value of each codeword. Table 1 exemplarily shows that the index 0 represents a transmission restriction status. Namely, if the receiving end (e.g., the UE) transmits the index of 0 as the CQI, this situation may be recognized as a transmission restriction status according to an agreement engaged between the transmission/receiving ends.

If the CQI is transmitted as the MCS index, the following table 2 shows another MCS table including a transmission restriction status according to this embodiment.

TABLE 2

| CQI value (state) for CW | Function |
| --- | --- |
| 0 | Modulation: 0 and/or code rate: 0 |
| 1 | Modulation: QPSK, code rate: 1/3 |
| 2 | Modulation: QPSK, code rate: 1/2 |
| 3 | Modulation: QPSK, code rate: 2/3 |
| 4 | Modulation: 16QAM, code rate: 1/3 |
| 5 | Modulation: 16QAM, code rate: 2/3 |
| 6 | Modulation: 64QPSK, code rate: 1/3 |
| 7 | Modulation: 64QPSK, code rate: 2/3 |

The above-mentioned embodiment of Table 2 is similar to that of Table 1. However, in this case, a modulation order 0 and/or a coding rate 0 represents a transmission restriction status Table 3 is an another example of MCS table including a transmission restriction status according to this embodiment when a MCS index is transmitted as CQI.

TABLE 3

| CQI value (state) for CW1 | Function | CQI value (state) for CW2 | Function |
| --- | --- | --- | --- |
| 0 | Modulation: QPSK, code rate: 1/3 | 0 | Tx off |
| 1 | Modulation: QPSK, code rate: 1/2 | 1 | Modulation: QPSK, code rate: 1/3 |
| 2 | Modulation: QPSK, code rate: 2/3 | 2 | Modulation: QPSK, code rate: 1/2 |
| 3 | Modulation: 16QAM, code rate: 1/3 | 3 | Modulation: QPSK, code rate: 2/3 |
| 4 | Modulation: 16QAM, code rate: 1/2 | 4 | Modulation: 16QAM, code rate: 1/3 |
| 5 | Modulation: 16QAM, code rate: 2/3 | 5 | Modulation: 16QAM, code rate: 2/3 |
| 6 | Modulation: 64QPSK, code rate: 1/3 | 6 | Modulation: 64QPSK, code rate: 1/3 |
| 7 | Modulation: 64QPSK, code rate: 2/3 | 7 | Modulation: 64QPSK, code rate: 2/3 |

In table 3, it is configured sot that the transmission restriction status information can be transmitted by only CQI values of some codewords.

According to the embodiments of tables 1 and 2, the table 1 and table 2 might be applied identically to all codewords, such that the transmission restriction status information can be transmitted to all codewords. However, according to the embodiment of Table 3, in the case of transmitting several codewords (e.g., 2 codewords), different tables are applied to two codewords. As a result, the transmission restriction status can be transmitted only for part of codewords, e.g. only for CW2.

Although index 0 represents the transmission restriction status in table 1 to table 3, it should be understood that other indexes may also be used to indicate the transmission restriction status. In addition, although MCS index is transmitted as CQI in table 1 to table 3, it should be understood that other information may also be used as CQI.

In the meantime, when CQI is transmitted, more specifically, when CQI of several codewords are transmitted, the MIMO system selects some of the several codewords, a specific CQI among all CQIs may be selected as a reference. In this case, for other CQIs except the specific CQI, a difference value (6CQI) to the reference value might be transmitted.

For example, if the Node-B transmits two codewords, CQI of CW1 may be used as a reference. In this case, for the CW2, a relative value to the reference value may be transmitted. Provided that a MCS index is transmitted as a CQI and the MSC table of Table 1 is used, when measured $CQI_{CW1}=6$ for CW1 and measured $CQI_{CW2}=5$ for CW2, a value of '6' which represents a index value according to the $CQI_{CW1}=6$ may be transmitted for CW1, and a value of '1' which represents a index value difference between the CW1's CQI index and the CW2's CQI index, i.e., $-CQI_{CW2}+CQI_{CW1}=-5+6=1$ may be transmitted for CW2.

According to the above-mentioned CQI transmission scheme, if several codewords have similar CQI values and there is a little difference between the CQI values, transmission of an differential CQI can reduce many more bits than in transmission of the actual value on the basis of the reference value, resulting in the reduction of Tx overhead of uplink control information.

For example, in Table 1, 3 bits are required to transmit the CQI index. Therefore, if there are two codewords, 6 bits are consumed. However, provided that the range of the differential value is established and transmitted in four steps, for a codeword for transmitting the CQI index with the differential, only 2 bits are required. Therefore, a total of 4 bits are consumed to transmit two CQI bits, such that 1 bit can be reduced.

The transmission method above using the CQI-differential value may be applied into the method for transmitting the CQI including transmission restriction status information. For example, as previously presumed, provided that the range of the differential value has 4 steps, differential values of the four steps are set to "$-CQI_{CW2}+CQI_{CW1}=\{-2,-1,0,1\}$", and one of the differential values is transmitted as a CQI signal for CW2, the CQI-index of CQI2 may be determined one of "$CQI_{CW2}=CQI_{CW1}+\{-1,0,1,2\}$".

When the CQI of CW2 is transmitted using a differential value to the reference CQI, the Node-B can determine (backtrack) the CQI-index of CW2 using both the CQI index for transmitting the CW1 and the relative CQI value for transmitting the CW2. For example, if $CQI_{CW1}$ is zero (i.e., $CQI_{CW1}=0$), $CQI_{CW2}$ may be determined as one of $\{-1, 0, 1, 2\}$. If $CQI_{CW1}$ is '1' (i.e., $CQI_{CW1}=1$), $CQI_{CW2}$ may be determined as one of $\{0, 1, 2, 3\}$.

When using this backtracking scheme, determined CQI of CW2 may indicate a index value defined as transmission restriction status or a non-existing value which is not defined in the original MCS table. For example, the CQI index of CW2 may indicate 0 indicating a transmission restriction status of Table 1, or may indicate an index value of −1 which is not defined in the index range. If the CQI of CW2 backtracked using this scheme indicates a index value defined as transmission restriction status or a non-existing value which is not defined in the original MCS table, a Node-B may interpret it as transmission restriction status occurred. That means, even when using the scheme of using the CQI-differential value, transmission restriction status can be delivered to the Node-B.

The CQI value for transmitting the CW2 codeword is not limited to any one of $\{-1, 0, 1, 2\}$, but may be defined by various values $\{-2, -1, 0, 1\}$ and $\{0, 1, 2, 3\}$. The range of the differential value may be reduced by 1 bit, such that the CQI value may be transmitted with $\{0, 1\}$, or $\{-1, 0\}$. The transmission-value or range of the differential value, i.e., the number of bits of the differential value, can be adaptively changed according to channel status.

Figure 5:
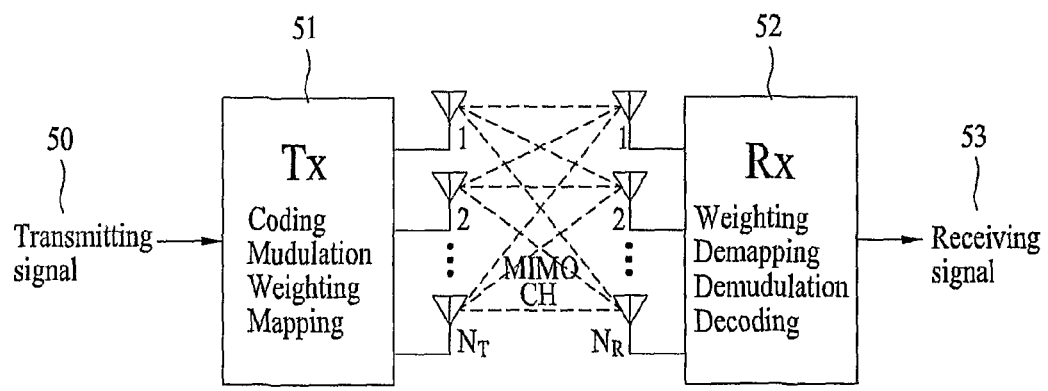
FIG. 5 is a conceptual diagram illustrating a Multiple Input Multiple Output (MIMO) system according to the present invention.

FIG. 5 is a conceptual diagram illustrating a Multiple Input Multiple Output (MIMO) system according to the present invention.

Referring to FIG. 5, a transmission (Tx) signal 50 is coded, modulated, weighted, precoded, and mapped by the signal processor 51 of the transmitting end, and than the resultant Tx signal is transmitted via several antennas. In this case, the Tx signal is composed of several codewords according to a predetermined rank, such that it can be differently processed according to the individual codewords. A reception (Rx) signal is processed at a signal processor 52 by inversely processing the process of the transmitting end.

A downlink CQI is measured with the received signal and then transmitted to the transmitting end. In this case, the channel quality may be composed of various-formatted CQI values, and be then transmitted to the transmitting end. If several codewords are transmitted according to this embodiment of the present invention, CQI of each codeword may be transmitted with containing transmission restriction status if necessary. A detailed description thereof is similar to those explained in above.

The transmitting end receives the CQI, processes the Tx signal according to the received CQI, and transmits the processed result to the receiving end, such that it can adapt to varying channel condition. In this case, if the transmitting end receives specific information from the receiving end indicating that some codewords are in transmission restriction status, it may transmit only some transmittable codewords irrespective of the receiver's feedback rank. Also, the Node-B may change a current rank to another rank, and may transmit signals via the changed rank.

The above-mentioned CQI may be referred to as channel information indicator or channel status information, etc. The above-mentioned CQI is not limited to the above-mentioned terms, but it can also be called other terms as necessary.

The following embodiments of the present invention will be disclosed on the basis of a data communication relationship between the Node-B and the user equipment (UE).

In this case, the Node-B is used as a terminal node of a network via which the Node-B can directly communicate with the user equipment (UE). Specific operations to be conducted by the user equipment (UE) in the present invention may also be conducted by an upper node of the Node-B as necessary. In other words, it will be obvious to those skilled in the art that various operations for enabling the Node-B to communicate with the user equipment (UE) in a network composed of several network nodes including the Node-B will be conducted by the Node-B or other network nodes other than the Node-B. The term "Node-B" may be replaced with a fixed station, base station (BS), eNode-B (eNB), or an access point as necessary. The term "user equipment (UE)" may be replaced with a mobile station (MS) or a mobile subscriber station (MSS) as necessary.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics.

Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It is obvious to those skilled in the art that the above embodiments may be constructed by combining claims having no explicit citation relations or new claims may also be added by the amendment to be made after the patent application.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the MIMO system according to the present invention can transmit CQI.

According to the following embodiments of the present invention, if the MIMO system transmits several codewords and the CQI of each codeword, it can indicate that some codewords are in a transmission restriction status using the CQI.

What is claimed is:

1. A method for a user equipment in a multiple input multiple output (MIMO) system, the method comprising:
    transmitting, by the user equipment, rank information at a first transmission periodicity; and
    transmitting, by the user equipment, first channel quality information (CQI) for a first codeword and a differential value at a second transmission periodicity, the differential value indicating a difference between the first CQI and a second CQI for a second codeword,
    wherein a period of the first transmission periodicity is longer than a period of the second transmission periodicity,
    wherein at least the first CQI or the second CQI is set to one of an index value of "0" and a plurality of index values,
    wherein the index value of "0" indicates a transmission restriction status for the corresponding first or second codeword, and
    wherein each of the plurality of index values is mapped to a coding rate and a modulation order.

2. The method according to claim 1, wherein the rank information is determined for an entire bandwidth for the user equipment.

3. The method according to claim 1, wherein the first CQI and the second CQI are determined for a CQI sub-band of an entire bandwidth for the user equipment.

4. The method according to claim 1, wherein the first CQI and the differential value are transmitted via a physical uplink control channel (PUCCH).

5. A method for a base station in a multiple input multiple output (MIMO) system, the method comprising:
    receiving rank information at a first transmission periodicity from a user equipment; and
    receiving first channel quality information (CQI) for a first codeword and a differential value from the user equipment at a second transmission periodicity, the differential value indicating a difference between the first CQI and a second CQI for a second codeword,
    wherein a period of the first transmission periodicity is longer than a period of the second transmission periodicity,
    wherein at least the first CQI or the second CQI is set to one of an index value of "0" and a plurality of index values,
    wherein the index value of "0" indicates a transmission restriction status for the corresponding first or second codeword, and
    wherein each of the plurality of index values is mapped to a coding rate and a modulation order.

6. The method according to claim 5, wherein the rank information is determined for an entire bandwidth for the user equipment.

7. The method according to claim 5, wherein the first CQI and the second CQI are determined for a CQI sub-band of an entire bandwidth for the user equipment.

8. The method according to claim 5, wherein the first CQI and the differential value are received via a physical uplink control channel (PUCCH).

9. A user equipment in a multiple input multiple output (MIMO) system, the user equipment comprising:
    one or more antennas each configured to transmit one or more downlink signals; and
    a signal processor configured to:
    control the one or more antennas to transmit rank information at a first transmission periodicity and transmit first channel quality information (CQI) for a first codeword and a differential value at a second transmission periodicity, the differential value indicating a difference between the first CQI and a second CQI for a second codeword,
    wherein a period of the first transmission periodicity is longer than a period of the second transmission periodicity,
    wherein the signal processor is further configured to set at least the first CQI or the second CQI to one of an index value of "0" and a plurality of index values,
    wherein the index value of "0" indicates a transmission restriction status for the corresponding first or second codeword, and
    wherein each of the plurality of index values is mapped to a coding rate and a modulation order.

10. The user equipment according to claim 9, wherein the signal processor is further configured to determine the rank information for an entire bandwidth for the user equipment.

11. The user equipment according to claim 9, wherein the signal processor is further configured to determine the first CQI and the second CQI for a CQI sub-band of an entire bandwidth for the user equipment.

12. The user equipment according to claim 9, wherein the signal processor is further configured to control the one or more antennas to transmit the first CQI and the differential value via a physical uplink control channel (PUCCH).

13. A base station in a multiple input multiple output (MIMO) system, the base station comprising:
one or more antennas each configured to receive one or more uplink signals; and
a signal processor configured to:
control the one or more antennas to receive rank information at a first transmission periodicity and to receive first channel quality information (CQI) for a first codeword and a differential value at a second transmission periodicity, the differential value indicating a difference between the first CQI and second CQI for a second codeword from a user equipment,
wherein a period of the first transmission periodicity is longer than a period of the second transmission periodicity,
wherein at least the first CQI or the second CQI is set to one of an index value of "0" and a plurality of index values,
wherein the index value of "0" indicates a transmission restriction status for the corresponding first or second codeword, and
wherein each of the plurality of index values is mapped to a coding rate and a modulation order.

14. The base station according to claim 13, wherein the rank information is determined for an entire bandwidth for the user equipment.

15. The base station according to claim 13, wherein the first CQI and the second CQI are determined for a CQI sub-band of an entire bandwidth for the user equipment.

16. The base station according to claim 13, wherein the signal processor is further configured to control the one or more antennas to receive the first CQI and the differential value via a physical uplink control channel (PUCCH).

* * * * *